3,139,514
PROCESSES OF ELECTRIC ARC WELDING
UNDER PROTECTIVE GAS
Peter Kaesmacher, Stolberg, Germany, assignor to Gebr.
Bohler & Co. Aktiengesellschaft, Vienna, Austria
No Drawing. Filed Mar. 26, 1962, Ser. No. 182,627
Claims priority, application Austria Mar. 31, 1961
7 Claims. (Cl. 219—145)

The present invention relates to the making of welded joints on plain carbon steels, which may be in a killed, semi-killed or rimming condition, and with the welding of low-alloy steels, and recommends for this purpose the use of a filler material containing about 30% Cr and about 9% Ni.

Such filler materials result in the weld in a ferritic austenitic structure having a ferrite portion between 10% and 40%. Owing to this ferrite portion, the coefficient of thermal expansion of the weld lies between the coefficients of thermal expansion of austenitic steels and those of plain carbon steels or low-alloy steels.

The weld formed by the filler material considered according to the invention would be desirable for making welded joints between non-austenitic steels and for making joints between austenitic and non-austenitic steels, in order to avoid stress cracks. To avoid embrittlement in the ferrite portion of the weld at temperatures above 400° C., however, such filler materials are suitable only for welded joints, which are not subjected to operating temperatures over 400° C.

In the manufacture of welded joints with filler materials containing about 30% Cr and 9% Ni on the base materials under consideration, however, it is not always possible to avoid pores and slag occlusions in the weld in manual welding even when working with the utmost care.

According to the invention, this difficulty may be avoided with electric arc welding under protective gas if the filler material consists of 0.1–0.15% C, 0.6–1.4% Si, 1.5–2.0% Mn, 29–31% Cr, 8.5–9.5% Ni, 0.15–0.20% Mo, 0.1–0.2% V, balance iron and inevitable impurities.

Compared to manual welding with similar coated electrodes, the use of protective gas welding with filler materials according to the invention enables a much higher welding speed and the avoidance of undesired faults. Besides, the welding under constrained conditions can be performed more easily and with less faults when a protective gas and thin wires are used. In this case too, a higher welding output can be achieved than with manual welding.

Inert gases, such as argon or helium, with oxygen additions, if desired, and mixtures of these gases may be used as protective gas.

It is obvious that the filler material recommended according to the invention, may also be used to advantage for weld surfacing on plain carbon steels or low-alloy steels where electric arc welding under protective gas is employed.

What I claim is:

1. A filler material for gas-shielded electric arc welding, said filler material consisting of 0.1–0.15% C, 0.6–1.4% Si, 1.5–2.0% Mn, 29–31% Cr, 8.5–9.5% Ni, 0.15–0.20% Mo, 0.1–0.2% V, balance iron and inevitable impurities.

2. A gas-shielded electric arc welding process for joining at least two parts of steel, said process comprising melting an alloy steel consisting of 0.1–0.15% C, 0.6–1.4% Si, 1.5–2.0% Mn, 29–31% Cr, 8.5–9.5% Ni, 0.15–0.20% Mo, 0.1–0.2% V, balance iron and inevitable impurities, as a filler material in an electric arc under a protective gas, and using the molten filler material in forming between said parts a joint which will resist temperatures up to 400° C.

3. A gas-shielded electric arc welding process for joining at least two parts of steel selected from the class consisting of plain carbon steels and low-alloy steels, said process comprising melting an alloy steel consisting of 0.1–0.15% C, 0.6–1.4% Si, 1.5–2.0% Mn, 29–31% Cr, 8.5–9.5% Ni, 0.15–0.20% Mo, 0.1–0.2% V, balance iron and inevitable impurities, as a filler material in an electric arc under a protective gas, and using the molten filler material in forming between said parts a joint which will resist temperatures up to 400° C.

4. A gas-shielded electric arc welding process for joining at least two parts of plain carbon steel, said process comprising melting an alloy steel consisting of 0.1–0.15% C, 0.6–1.4% Si, 1.5–2.0% Mn, 29–31% Cr, 8.5–9.5% Ni, 0.15–0.20% Mo, 0.1–0.2% V, balance iron and inevitable impurities, as a filler material in an electric arc under a protective gas, and using the molten filler material in forming between said parts a joint which will resist temperatures up to 400° C.

5. A gas-shielded electric arc welding process for joining at least two parts of low alloy steel, said process comprising melting an alloy steel consisting of 0.1–0.15% C, 0.6–1.4% Si, 1.5–2.0% Mn, 29–31% Cr, 8.5–9.5% Ni, 0.15–0.20% Mo, 0.1–0.2% V, balance iron and inevitable impurities, as a filler material in an electric arc under a protective gas, and using the molten filler material in forming between said parts a joint which will resist temperatures up to 400° C.

6. A gas-shielded electric arc welding process for joining at least two parts, one of which consists of plain carbon steel and the other of low alloy steel, said process comprising melting an alloy steel consisting of 0.1–0.15% C, 0.6–1.4% Si, 1.5–2.0% Mn, 29–31% Cr, 8.5–9.5% Ni, 0.15–0.20% Mo, 0.1–0.2% V, balance iron and inevitable impurities, as a filler material in an electric arc under a protective gas, and using the molten filler material in forming between said parts a joint which will resist temperatures up to 400° C.

7. A gas-shielded electric arc welding process for joining at least two parts, one of which consists of a non-austenitic steel and the other of an austenitic steel, said process comprising melting an alloy steel consisting of 0.1–0.15% C, 0.6–1.4% Si, 1.5–2.0% Mn, 29–31% Cr, 8.5–9.5% Ni, 0.15–0.20% Mo, 0.1–0.2% V, balance iron and inevitable impurities, as a filler material in an electric arc under a protective gas, and using the molten filler material in forming between said parts a joint which will resist temperatures up to 400° C.

References Cited in the file of this patent
UNITED STATES PATENTS
2,405,666    Norwood _____ Aug. 13, 1946